United States Patent
Rigney et al.

(10) Patent No.: US 6,372,321 B1
(45) Date of Patent: Apr. 16, 2002

(54) COATED ARTICLE WITH INTERNAL STABILIZING PORTION AND METHOD FOR MAKING

(75) Inventors: Joseph D. Rigney, Milford; Elissa H. Lee, Cincinnati; Jeffrey A. Conner, Hamilton; Michael J. Weimer, Loveland, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/527,661

(22) Filed: Mar. 17, 2000

(51) Int. Cl.$^7$ ............................. B32B 5/12; B05D 5/00
(52) U.S. Cl. ................. 428/105; 428/35.8; 428/35.9; 428/131; 428/142; 428/209; 428/210; 427/243; 427/404; 427/405
(58) Field of Search .................. 428/35.8, 35.9, 428/131, 142, 105, 209, 210; 427/243, 404, 405

(56) References Cited

U.S. PATENT DOCUMENTS 4,371,430 A * 2/1983 Ballarini et al. .......... 204/32 R

* cited by examiner

Primary Examiner—Blaine Copenheaver
Assistant Examiner—Kai Vo
(74) Attorney, Agent, or Firm—Andrew C. Hess; David L. Narciso

(57) ABSTRACT

A coated article is provided with a coating stabilizing portion in a coating combination on a substrate of the article. The coating combination includes a coating diffusion portion on the substrate and an outer coating portion outwardly from the coating diffusion portion. The coating stabilizing portion is provided between the coating diffusion portion and the outer coating portion to inhibit diffusion of undesirable elements to an interface with the outer coating portion and to enhance mechanical properties.

25 Claims, 2 Drawing Sheets

COATED ARTICLE WITH INTERNAL STABILIZING PORTION AND METHOD FOR MAKING

BACKGROUND OF THE INVENTION

This invention relates to articles coated with an environmental resistant coating, and, more particularly, to coated articles made of high temperature alloys for operation at high temperatures in a strenuous operating environment.

Gas turbine engine components operating in the hotter sections of such an engine, for example the turbine section, experience wide temperature extremes in an oxidizing and corrosive environment. Therefore, it has been a practice to apply to surfaces of such components a variety of types and combinations of high temperature protective coatings widely reported in the art. The coatings not only protect the component surface from the environment but also afford an engine designer the opportunity to improve efficiency of the engine by increasing operating temperatures.

Typical gas turbine engine component coatings include oxidation and corrosion resistant coatings including aluminum, forms of which are called diffusion aluminide coatings, on an article substrate. Such coatings are applied alone or in combination with an outer thermal barrier coating (TBC), for example of the ceramic type. However, as a result of cyclical operation under strenuous conditions, such protective coatings are subject to degradation. It is believed that such degradation of a protective coating or coating combination can result from inter-diffusion of coating and substrate elements along relatively direct grain boundaries toward the coating surface. In addition to the chemical degradation, cyclical exposure of the substrate-coating system resulting in growth of a thermally grown oxide (TGO) layer within the coating system can result in a condition sometimes referred to as "rumpling". Such a condition has been observed to be more severe at a junction of "straight-through" grain boundaries and the TGO. One typical reported coating combination or system comprises a substrate, such as a Ni base superalloy, having a single phase aluminide type coating diffused into the substrate, and a ceramic type TBC over the diffused aluminide layer. The aluminide coating acts as a bond coat for the TBC and an oxidation resistant coating for the substrate. The single phase aluminide coating generally is grown with grain boundaries extending directly, in a relatively straight path, between a diffusion zone of the coating at the substrate and the outer TBC. With this as-deposited microstructure, having relatively simple direct grain boundaries, it is believed that at least one element from the substrate and/or the diffusion zone can diffuse easily and directly to an interface between the TBC and the underlying, additive bond-type coating. If the element that diffuses to the bond coat/TBC interface forms a non-protective oxide, this occurrence can result in spalling of the TBC. Also, such a microstructure is susceptible to oxygen penetration from the environment along the grain boundaries, causing oxidation and stressing the coating. This also can result in spallation. In addition, such microstructure can be relatively weak and prone to surface displacement during thermal cycling to elevated temperatures. These surface displacements can cause damage to the TGO and eventual spallation of the TBC.

BRIEF SUMMARY OF THE INVENTION

The present invention, in one form, provides a coated article comprising a substrate, and a coating combination on the substrate. The coating combination includes a coating diffusion portion at the substrate, an outer coating portion outwardly from the diffusion portion and a coating stabilizing portion between the coating diffusion portion and the outer coating portion. The coating stabilizing portion includes a microstructure having a plurality of grains with grain boundaries between adjacent grains defining a plurality of labyrinthine paths through the stabilizing portion between the coating diffusion portion and the outer coating portion.

In another form, the present invention provides a method for making a coated article in which such a coating stabilizing portion is provided between the diffusion portion and an outer coating portion.

DETAILED DESCRIPTION OF THE INVENTION

Airfoils of gas turbine engine turbine components typically are made of a Ni base superalloy as a substrate, for example the commercially available Rene' 125 alloy, Rene' 142 alloy or Rene' N5 alloy, with a coating combination on the substrate for environmental protection during operation. One commonly used protective coating combination includes a diffusion aluminide coating portion at the substrate and a ceramic type TBC disposed over the aluminide coating. Diffusion aluminide coatings, for example the Codep aluminide coating generally described in Levine et al. U.S. Pat. Nos. 3,540,878; 3,598,638; and 3,667,985, have been applied by a variety of reported and used methods. These methods include, and sometimes are referred to in the art as, pack cementation, above the pack, vapor phase, chemical vapor deposition, and slurry coating methods. It has been common practice to enhance the performance of such a diffusion aluminide coating by the incorporation of a variety of secondary elements such as noble metal like Pt, Rh and/or Pd, as well as other elements such as Cr, Si, Hf, Zr, and/or Y.

Figure 1:
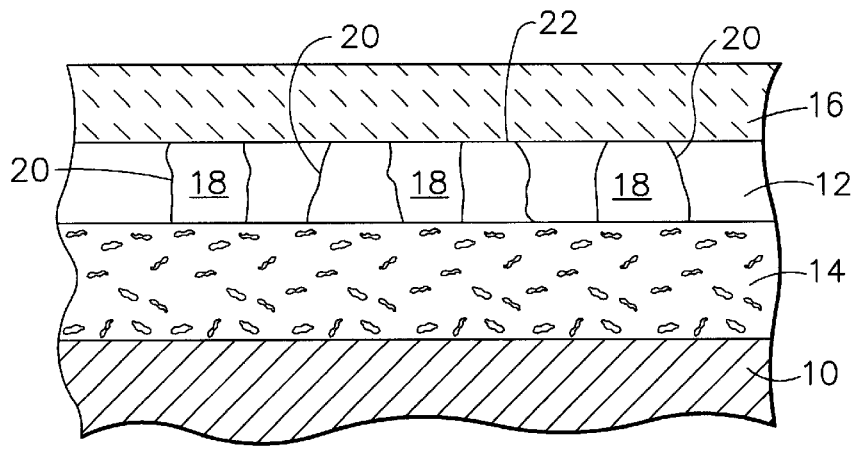
FIG. 1 is a diagrammatic fragmentary sectional view of an article with a prior art coating combination on an article substrate, the coating combination comprising a diffusion portion on the substrate, an aluminide additive coating on the diffusion portion, and an outer TBC on the additive portion.

Deposition of such known coatings has resulted in a coating microstructure having relatively large grains with relatively simple grain boundaries between adjacent grains generally directly outwardly across a coating portion. Sometimes such a structure is referred to as "bamboo-like" in cross-sectional metallographic views, with grain boundaries crossing an entire coating additive layer at high angles to the interface with the substrate or with the diffusion zone. One example of such a known, prior art structure is shown in the diagrammatic fragmentary sectional view of FIG. 1. In FIG. 1, a metal substrate 10, for example of a cast Ni base superalloy, includes a protective coating combination. The combination comprises an additive coating layer or portion 12, for example a beta phase aluminide. As a result of relatively high temperature processing of the additive coating and the process by which it is created, a diffusion zone or portion 14 exists between substrate 10 and additive coating portion 12. An outer ceramic type TBC portion 16 is disposed on additive layer 12 to complete the coating combination. This general type of TBC system has been reported in such U.S. Pat. Nos. as 4,055,705—Stecura et al., 4,095,003—Weatherly et al., 4,328,285—Siemers et al., 5,216,808—Martus et al., and 5,236,745—Gupta et al.

Generally, deposition and subsequent diffusion of an aluminide additive coating portion results in a coating microstructure with a plurality of relatively large grains 18, each extending through the coating additive layer 12 and separated by grain boundaries 20, typically as shown in FIG. 1. Therein, grain boundaries 20 between adjacent grains define relatively simple, straight paths directly between diffusion portion 14 and outer TBC portion 16, generally at high angles to substrate 10 and diffusion portion 14. Such a grain and grain boundary structure enables elements, for example undesirable refractory metal and/or impurity atoms, from substrate 10 and/or diffusion portion 14 to diffuse relatively easily between grains, along grain boundaries 20, to an interface 22 between additive portion 12 and outer TBC portion 16. As a result of this diffusion and the potential poor mechanical response of these boundaries, such grain boundary regions at the interface have been the site for generation of oxide scale and delamination failures. Evidence suggests that the presence of such diffused elements and loss of Al and other enhancing elements at interface 22 promotes early spallation of the outer TBC portion 16 from the coating system combination and poor mechanical properties.

The present invention, in one form, provides a coated article, the coating of which includes a multi-grained coating stabilizing portion outwardly from a coating diffusion portion and between the coating diffusion portion and an outer coating portion. The coating stabilization portion includes a microstructure having a plurality of grains with grain boundaries between adjacent grains defining, through the coating stabilizing portion, a relatively complex, indirect grain boundary path as compared with the relatively simple, direct path of the grain boundaries 20 in FIG. 1. Such relatively complex, indirect grain boundary path between adjacent grains herein is called a labyrinthine path. The labyrinthine path is not generally directly between the coating diffusion portion and the outer coating portion but includes a plurality of points of inflection, intersection or change of direction along its path at junctures between or abutment with boundaries of adjacent grains. This complex grain structure can provide enhanced performance through changes in inter-diffusion of the coating and substrate elements and improvements in the mechanical properties of an additive layer during thermal cycling. In some forms, the complex grain structure of the coating stabilizing portion can include islands of other phases or other compounds, for example compounds of Pt and Al, of Hf and noble metals, of reactive elements, etc.

In one form, such a path is generated by providing multiple layers or tiers of grains of the coating stabilizing portion, for example located or generated outwardly from an additive coating portion, of a size less than grains of an additive coating portion beneath the coating stabilizing portion. The finer grained structure of the coating stabilizing portion inhibits the diffusion of undesirable elements along grain boundaries between a substrate and/or diffusion portion to an interface at an outer coating portion, for example a TBC. In an embodiment in which a coating combination includes, in sequence over a substrate, a diffusion portion, an additive portion, a coating stabilization portion and an outer portion, the grain size of grains of the coating stabilization portion is less than the grain size of grains of the additive portion over which it is disposed.

Figure 2:
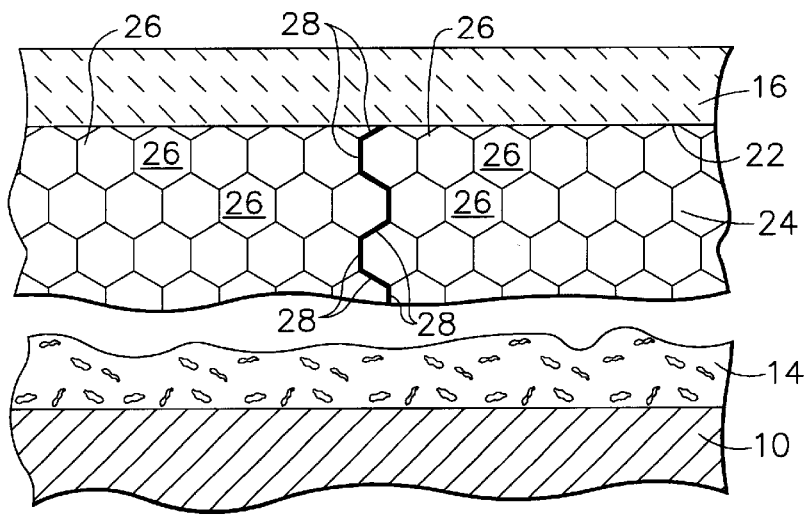
FIG. 2 is a diagrammatic fragmentary sectional view of an article with a form of the coating combination of the present invention including a coating stabilization portion with a multi-grained microstructure between the diffusion portion and the outer TBC.

One embodiment of the article of the present invention is shown in the diagrammatic fragmentary, sectional view of FIG. 2. The protective coating system or combination of FIG. 2, according to a form of the present invention, comprises a coating stabilization portion 24 between diffusion portion 14 and outer coating portion 16. Coating stabilization portion 24 includes a plurality of stabilization grains 26 separated by stabilization grain boundaries 28 that together define a plurality of the above-specified labyrinthine paths through coating stabilization portion 24. In FIG. 2, a plurality of layers or tiers of grains 26 are disposed outwardly from substrate 10, with grain boundaries 28 of adjacent grains in a layer and in adjacent layers intersecting one with another. This arrangement defines the labyrinthine paths. In FIG. 2 for clarity, one labyrinthine path is shown in bold between outer coating portion 16 and diffusion portion 14. It is believed that such complex grain structure can affect diffusion of undesirable elements from substrate 10 and/or diffusion portion 14 to interface 22, and loss of desirable coating elements (for example Al and other enhancing elements), and can change the mechanical response of the coating during thermal cycling.

Figure 3:
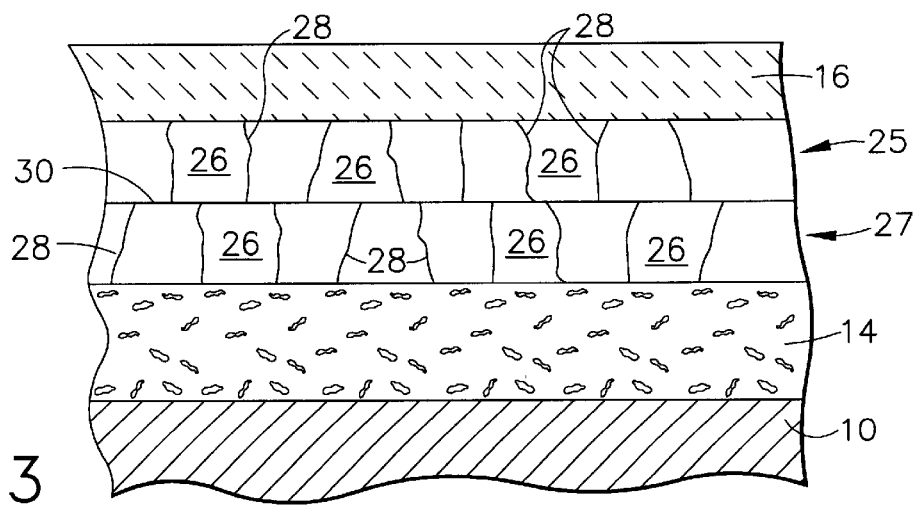
FIG. 3 is a diagrammatic fragmentary sectional view of another form of a coating stabilization portion comprising a plurality of superimposed multi-grained layers.

FIG. 3 is a diagrammatic fragmentary, sectional view of one embodiment of a coating stabilization portion represented in the form of a plurality of superimposed multi-grained layers, for example layers 25 and 27. In FIG. 3, each of the layers 25 and 27 of the coating stabilization portion has a grain structure similar to the grain structure of boundaries 20 in FIG. 1. However when superimposed in a plurality of layers, grain boundaries 28 together with each other and interface 30 between adjacent layers 25 and 27 of the coating stabilization portion define the above specified labyrinthine path. Grain boundaries 28 of adjacent layers abut or intersect with interface 30.

Figure 4:
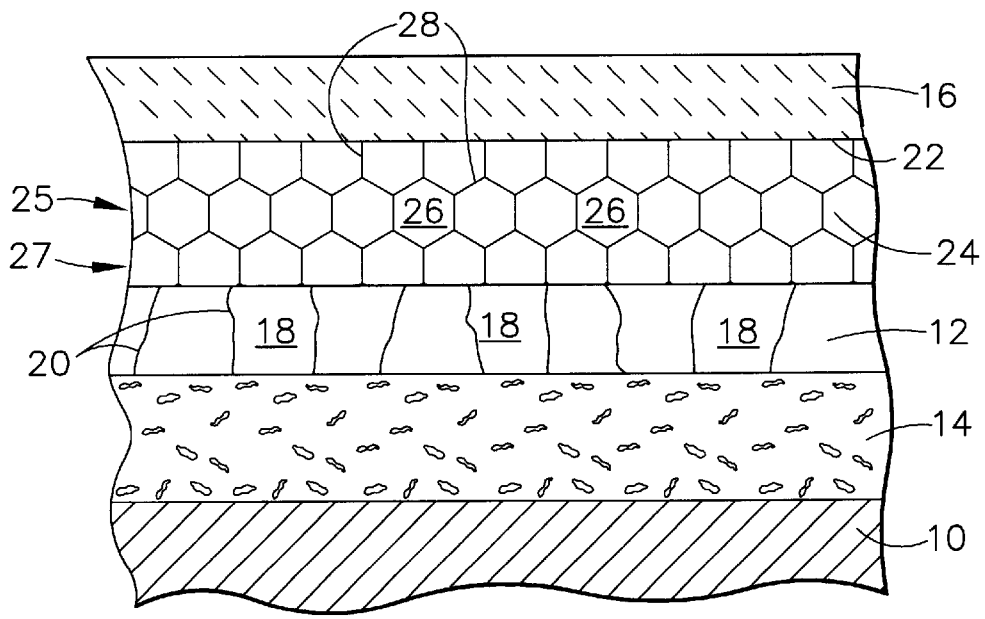
FIG. 4 is a diagrammatic fragmentary sectional view of another form of the present invention including an additive coating portion between the diffusion portion and the multi-grained coating stabilization portion.

FIG. 4 is a diagrammatic fragmentary sectional view of a more specific form of the embodiment of FIG. 2. In FIG. 4, an additive coating portion 12 is included between diffusion portion 14 and coating stabilizing portion 24. The labyrinthine paths of grain boundaries 28 of grains 26 can inhibit diffusion of undesirable elements from substrate 10 and/or diffusion portion 14 to interface 22, and avoid formation of non-protective oxides at interface 22 with outer coating portion 16. The formation of non-protective oxides, for example as can be created by diffusion of elements other than Al to interface 22, can result in excessive scale growth and hence stress build up leading to oxide scale spallation. According to a form of the present invention, such a change in diffusion characteristics provides the coating system with dimensional stability and improved mechanical behavior. In this embodiment, the grain size of stabilizing grains 26 of the fine grained coating stabilizing portion 24 is less than the grain size of grains 18 of additive coating portion 12.

Figure 5:
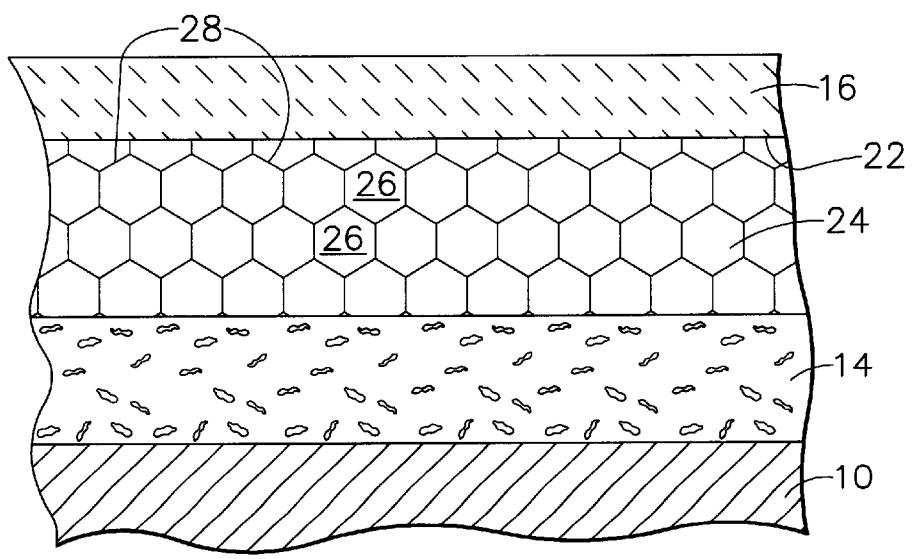
FIG. 5 is a diagrammatic fragmentary sectional view of a form of the present invention in which the multi-grained coating stabilization portion is adjacent the diffusion portion.

FIG. 5 is a diagrammatic fragmentary sectional view of another form of the present invention in which coating stabilizing portion 24 is disposed directly over diffusion portion 14.

In one series of evaluations of the present invention, specimens of Ni base superalloys commercially available as Rene' N5 alloy and Rene'142 alloy were prepared with a conventional coating combination of the type described in connection with FIG. 1, as a baseline for the evaluations. A conventional Pt—Al coating was provided by first electrodepositing Pt, and aluminiding the Pt using a commercial vapor phase aluminiding process. In this way, the Ni base superalloys as the substrate were coated to a thickness of about 2.5 mils with the Pt—Al coating. Such aluminide processing, by low activity aluminum vapor phase aluminiding at about 1975° F., provided the diffusion portion 14 and the additive portion 12, including the type of grains 18 and grain boundaries 20 shown in FIG. 1. Thereafter, a ceramic base TBC comprising about 93 wt. % zirconia stabilized with about 7 wt. % yttria was applied as the outer coating portion, to a thickness of about 5–10 mils using a commercial electron beam physical vapor deposition method. This provided baseline specimens for comparison with specimens prepared according to forms of the present invention.

Specimens representing forms of the present invention were prepared by additional processing of the baseline specimens after aluminiding and prior to application of the TBC. This preparation provided the coating stabilizing portion including the plurality of labyrinthine paths between relatively fine grains, with a grain structure of the type shown in FIGS. 2 and 4. The above described aluminide coating on the substrate, as a first aluminide additive coating portion, was grit blasted and electroplated with platinum to a thickness of about 0.1 mils. The electroplated Pt was heated in the range of about 1700–1950° F. for about 2 hours in a vacuum to diffuse Pt into the substrate. Such Pt coating then was aluminided at about 1975° F., using vapor phase aluminiding with an aluminum source (sometimes called a low activity aluminum source) that results in about 18–25 wt. % Al in a Pt—Al coating. This provided a Pt—Al coating, as a second aluminide additive coating portion at a total thickness of about 4.5 mils.

The resulting coating stabilizing portion primarily was a single phase Pt—Al, although in practice second phases for example $PtAl_2$ can be present. The coating on the substrate of the specimens at this point included a diffusion portion 14, a first aluminide additive coating portion 12, and a coating stabilizing portion 24 as a second aluminide additive coating portion. The total thickness of such coating combination was about 6 mils, although substantially thinner coatings (2–4 mils) have been achieved in practice. The ceramic TBC described in connection with the baseline specimens above then was applied as the outer coating portion of the coating combination on the substrate.

The finer grain microstructure and the volume fraction of the coating stabilizing portion can be altered or adjusted responsive to the intended application or use. In addition, the presence of at least one second phase, examples of which include $PtAl_2$ and precipitates of Cr or reactive elements, can be included. For example, processing details such as thickness of the Pt deposit and/or aluminum activity of the second aluminiding operation have been used to adjust the microstructure.

The specimens prepared as described above were compared in a standard furnace cycle test. Each test cycle was one hour in length and included heating for 45 minutes at about 2075° F., cooling during about 15 minutes to below 200° F., and reheating to about 2075° F. The number of cycles required to achieve more than 20% spallation of the TBC from the surface of the specimen was considered to be the failure life.

The typical furnace cycle test performance of the baseline specimens, prepared as described above and representative of the known coating combination structure shown in FIG. 1, had an average life of about 480 cycles. The coating combination of the present invention in the form with the coating stabilizing portion beginning with a single phase Pt—Al coating, prepared as described above, showed significant improvement in life with an average life of about 600 cycles.

In other evaluations of forms of the present invention, the grain size of the plurality of grains in the coating stabilizing portion was varied. For example, this was accomplished by starting with a two-phase Pt—Al coating rather than a single phase Pt—Al coating, as described above, before the second aluminiding. The average life of such forms of the present invention in the furnace cycle test was in the range of about 600–700 cycles.

An advantage of the present invention is that it can be used to enhance the performance of an existing article already including an environmental resistance coating with an outer coating portion, for example a TBC. Enhancement can be accomplished by removing the outer coating portion to expose an underlying coating portion, providing the coating stabilizing portion on the coating exposed underlying coating portion, and then reapplying an outer coating portion over the coating stabilizing portion. Such enhancement has been accomplished with newly made gas turbine engine turbine components as well as with such components after engine operation. The enhancement included removing an outer TBC to expose an underlying aluminide coating portion, providing the above described coating stabilizing portion on the underlying coating portion, and then reapplying the TBC.

The present invention has been described in connection with specific examples, materials, microstructures, coating combinations, processing details, and embodiments. These are intended to be typical of, rather than in any way limiting on the scope of the present invention. Those skilled in the arts associated with this invention will understand that it is capable of variations and modifications without departing from the scope of the appended claims.

What is claimed is:

1. A coated article comprising a substrate and a coating combination on the substrate, the coating combination including a coating diffusion portion on the substrate and an outer coating portion outwardly from the coating diffusion portion, wherein:

the coating combination includes a coating stabilizing portion between the coating diffusion portion and the outer coating portion;

the coating stabilizing portion including a microstructure having a plurality of grains with grain boundaries between adjacent grains defining a plurality of labyrinthine paths through the coating stabilizing portion between the coating diffusion portion and the outer coating portion.

2. The article of claim 1 in which grains of the coating stabilizing portion are disposed in a plurality of layers outwardly from the substrate, with grain boundaries of adjacent grains intersecting one with another.

3. The article of claim 1 in which the coating stabilizing portion is an aluminide.

4. The article of claim 3 in which the aluminide includes at least one element selected from the group consisting of Pt, Rh, Pd, Cr, Si, Hf, Zr, and Y.

5. The article of claim 1 in which the outer coating portion is a ceramic base thermal barrier coating.

6. The article of claim 1 in which the coating combination comprises:
   a coating diffusion portion on the substrate;
   an aluminide additive coating portion on the coating diffusion portion and having grains of a first grain size; and,
   a coating stabilizing portion on the aluminide additive coating portion and having grains of a second grain size less than the first grain size.

7. The article of claim 6 in which both the aluminide additive coating portion and the coating stabilizing portion include at least one element selected from the group consisting of Pt, Rh, Pd, Cr, Si, Hf, Zr, and Y.

8. The article of claim 6 in which the outer coating portion is a ceramic base thermal barrier coating.

9. The article of claim 8 in the form of a gas turbine engine component in which:
   the substrate is a Ni base superalloy; and,
   the coating stabilizing portion is an aluminide.

10. The article of claim 9 in which:
    the component includes an airfoil as the substrate;
    the coating combination is disposed on the airfoil; and,
    the coating stabilizing portion is an aluminide including at least one element selected from the group consisting of Pt, Rh, Pd, Cr, Si, Hf, Zr, and Y.

11. In a method for providing an article with an environmental resistant coating including a coating diffusion portion on an article substrate and an outer coating portion outwardly from the coating diffusion portion, the step of:
    providing between the coating diffusion portion and the coating outer portion a coating stabilizing portion that includes a microstructure having a plurality of grains with grain boundaries between adjacent grains defining a plurality of labyrinthine paths through the coating stabilizing portion between the coating diffusion portion and the outer coating portion.

12. The method of claim 11 in which a ceramic base thermal barrier coating is provided as the outer coating portion over the coating stabilizing portion.

13. The method of claim 11 in which the coating stabilizing portion is provided by aluminiding to provide an aluminide coating stabilizing portion.

14. The method of claim 13 in which the aluminide of the coating stabilizing portion includes at least one element selected from the group consisting of Pt, Rh, Pd, Cr, Si, Hf, Zr, and Y.

15. The method of claim 13 in which:
    the article includes on the coating diffusion portion a first aluminide additive coating portion having grains of a first grain size; and,
    the first aluminide additive coating portion is aluminided to provide the coating stabilizing portion as a second aluminide additive coating portion on the first aluminide additive coating portion;
    the coating stabilizing portion being provided with grains of a second grain size less than the first grain size and the microstructure defining the plurality of labyrinthine paths.

16. The method of claim 15 in which the coating stabilizing portion is provided in a plurality of layers of grains outwardly from the substrate, with grain boundaries of adjacent grains intersecting one with another.

17. The method of claim 15 in which the second aluminide additive coating includes at least one element selected from the group consisting of Pt, Rh, Pd, Cr, Si, Hf, Zr, and Y.

18. The method of claim 17 in which the first aluminide additive coating portion includes at least one element selected from the group consisting of Pt, Rh, Pd, Cr, Si, Hf, Zr, and Y.

19. The method of claim 18 in which the second aluminide additive coating portion includes at least one element selected from the group consisting of Pt, Rh, Pd, Cr, Si, Hf, Zr, and Y.

20. In the method of claim 11 for providing a gas turbine engine component with an environmental resistant coating on a Ni base superalloy article substrate, the steps of:
    aluminiding the article substrate to provide a coating diffusion portion on the substrate and a first aluminide additive coating portion on the coating diffusion portion, the first aluminide additive coating portion having grains of a first grain size; and,
    aluminiding the first aluminide additive coating portion to provide the coating stabilizing portion, the coating stabilizing portion having a plurality of layers of grains of a second grain size less than the first grain size.

21. The method of claim 20 in which the coating stabilizing portion is provided in a plurality of layers of grains outwardly from the substrate, with grain boundaries of adjacent grains intersecting one with another.

22. The method of claim 20 in which a ceramic base thermal barrier coating is disposed as the outer coating portion over the coating stabilizing portion.

23. The method of claim 20 in which the second aluminide additive coating portion is provided by:
    depositing Pt on the first aluminide additive coating portion; and,
    aluminiding the Pt using a low activity aluminum source to provide a Pt—Al coating portion.

24. The method of claim 11 for enhancing on an article an existing environmental resistance coating including an outer coating portion, comprising the steps of:
    removing the outer coating portion to expose an underlying coating portion;
    disposing the coating stabilizing portion on the underlying coating portion; and,
    applying an outer coating portion on the coating stabilizing portion.

25. The method of claim 24 in which:
    the article is a gas turbine engine component having an environmental resistant coating including a TBC outer coating portion over an aluminide underlying coating portion; and,
    after removing the TBC outer coating portion, the underlying coating portion is aluminided to provide the coating stabilizing portion disposed on the underlying coating portion.

* * * * *